United States Patent
Marcade et al.

(10) Patent No.: US 7,139,166 B2
(45) Date of Patent: Nov. 21, 2006

(54) HARD DRIVE CARRIER

(75) Inventors: Michael D. Marcade, Pflugerville, TX (US); Robert R. McAlister, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 10/940,072

(22) Filed: Sep. 14, 2004

(65) Prior Publication Data

US 2006/0056146 A1    Mar. 16, 2006

(51) Int. Cl.
*G06F 1/16*    (2006.01)
(52) U.S. Cl. .................... 361/685; 312/223.1; 248/682
(58) Field of Classification Search ........ 361/679–687, 361/724–727, 688, 816, 818; 439/638; 360/92; 312/223.1–223.3; 248/682, 694
See application file for complete search history.

(56) References Cited

U.S. PATENT DOCUMENTS

| 5,089,920 A | * | 2/1992 | Bryer et al. | 360/92 |
| 2003/0011978 A1 | * | 1/2003 | Moore | 361/685 |
| 2004/0095716 A1 | * | 5/2004 | McAlister | 361/685 |

* cited by examiner

*Primary Examiner*—Hung Van Duong
(74) *Attorney, Agent, or Firm*—Baker Botts L.L.P.

(57) ABSTRACT a hard drive carrier is disclosed that includes a detachable tab on the top wall of the frame of the carrier. When the tab is detached a hard drive can be placed in the hard drive carrier in a forward position. When the tab is in place, the hard drive can be retained in the frame of the hard drive carrier in a rear position. The top wall of the frame and the top guide rail include a set of alignment holes to accommodate the positioning of the hard drive in a forward position or a rear position.

20 Claims, 5 Drawing Sheets

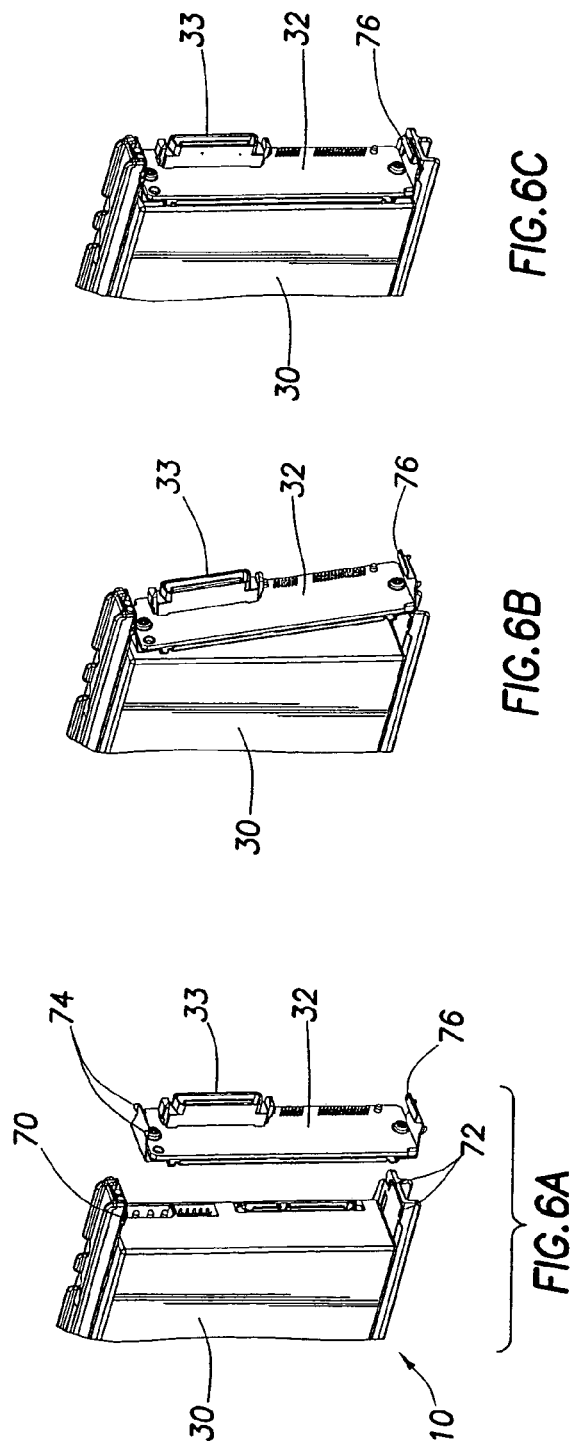
FIG.6A
FIG.6B
FIG.6C
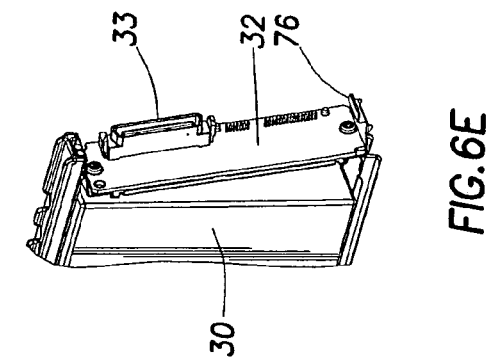
FIG.6D
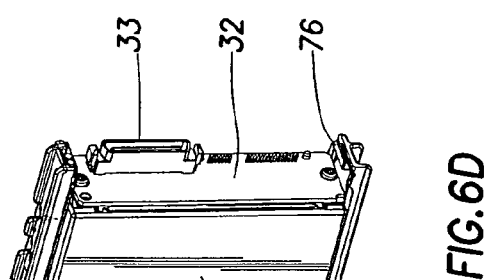
FIG.6E

HARD DRIVE CARRIER

CROSS-REFERENCE TO RELATED APPLICATION

The present disclosure is related to U.S. application Ser. No. 10/294,422, which is titled "Hard Drive Carrier," was filed on Nov. 14, 2002, and which is incorporated herein by reference in its entirety.

TECHNICAL FIELD

The present disclosure relates generally to computer systems and information handling systems, and, more particularly, to a hard drive carrier for a computer system or information handling system.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

An information handling system or computer system may include a hard drive that is coupled to the chassis of a computer or a drive bay. A hard drive is typically disposed on a carrier assembly, often referred to as a hard drive carrier, and the carrier assembly is inserted, via a guide rail system, into a bay in a computer chassis. The hard drive carrier serves as a protective housing for the hard drive and mechanically mates with a drive bay in a computer chassis.

SUMMARY

In accordance with the present disclosure, a hard drive carrier is disclosed that includes a detachable tab on the top wall of the frame of the carrier. When the tab is detached a hard drive can be placed in the hard drive carrier in a forward position. When the tab is in place, the hard drive can be retained in the frame of the hard drive carrier in a rear position. The top and bottom walls of the frame and the guide rails include a set of alignment holes to accommodate the positioning of the hard drive in a forward position or a rear position. The top and bottom guide walls include a retention hook, and the rails include an aligned retention hole. The arrangement of the retention hook of the top and bottom walls and the retention hole of the guide rails allows the rails to be coupled to the wall by placing the hook at least partially in the hole and sliding the guide rails relative to the top and bottom walls to cause the hook to engage the hole of the guide walls. The hard drive carrier disclosed herein includes a lower guide rail that includes a series of keying holes for receiving keying pins to form a barrier that prevents the hard drive carrier from being inserted in certain slots of a chassis. The hard drive carrier disclosed herein includes a detachable converter card. The converter card includes spring tabs for inserting the converter card into and removing the converter card from the frame of the hard drive carrier.

The hard drive carrier disclosed herein is technically advantageous because its physical design is able to accommodate a hard drive in two positions in the hard drive. The ability of the hard drive carrier to support a hard drive in two positions—a forward position and a rear position—allows a converter card to be attached to the hard drive carrier when the hard drive carrier is configured to accommodate a hard drive in the forward position. When a converter card is not necessary, the hard drive can be placed in a rear position in the hard drive carrier.

Another technical advantage of the system and method disclosed herein is the physical design of the guide rails and top and bottom walls of the hard drive carrier. The arrangement of the retention hooks of the top and bottom walls of the frame and the aligned retention holes of the guide rails permit the too-less assembly of the guide rails and top and bottom walls. Another technical advantage is the provision of a converter card that can be coupled within the frame of the hard drive carrier through a pair of springs in the converter card. The springs of the converter card mate with slots in the hard drive carrier, allowing the converter card to be attached and detached from the hard drive carrier without tools or additional fixtures. As another technical advantage, the bottom guide rails of the hard drive carrier include a number of keying holes and keying pins for insertion therein. The placement of keying holes in the keying pins forms a mechanical barrier that prevents that hard drive carrier from being placed in a chassis that is not compatible with the connectors of the hard drive. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIGS. 6A–6E are a series of perspective view concerning the assembly and disassembly of a converter card in a hard drive carrier.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a person computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Figure 1:
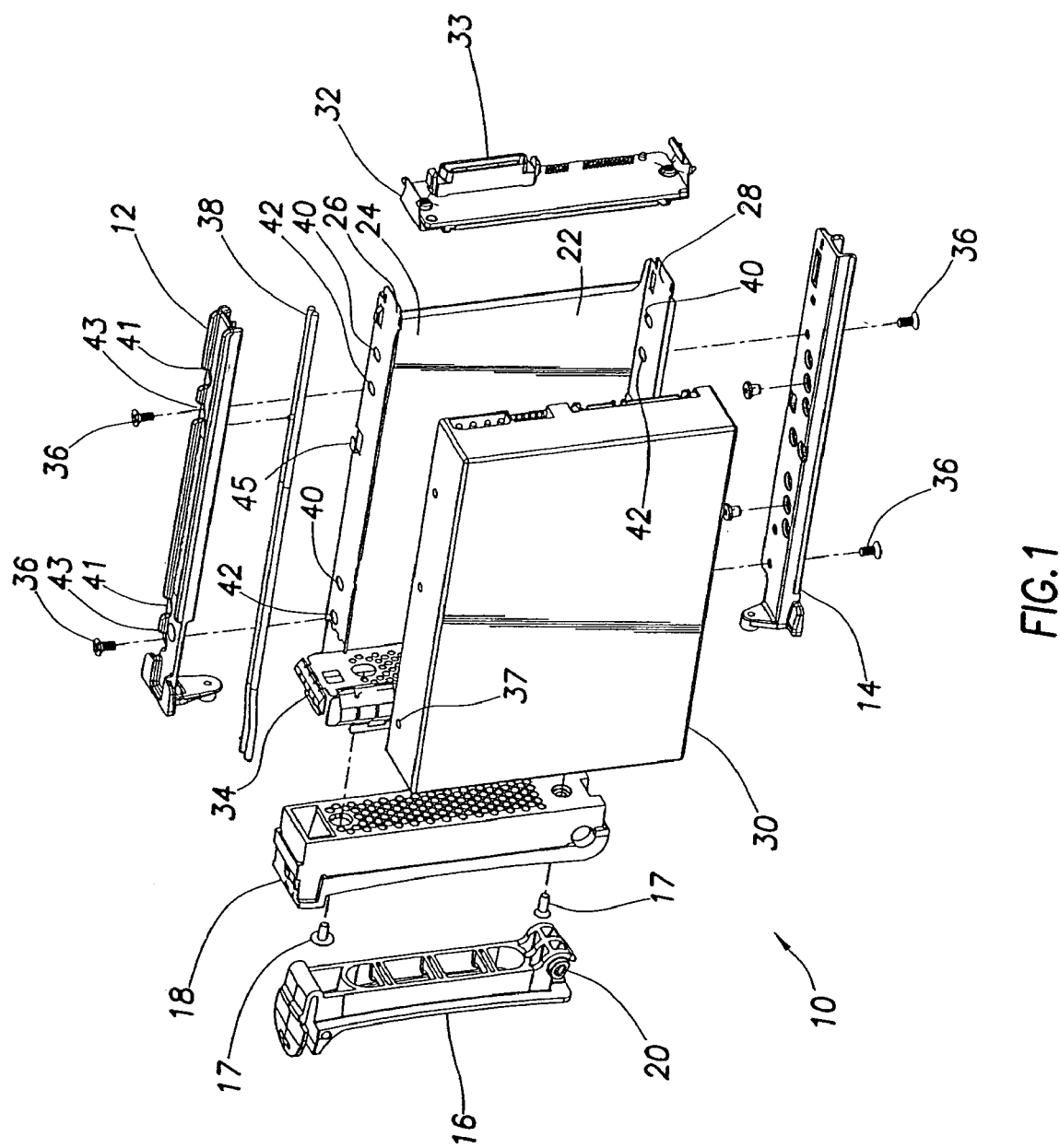
FIG. 1 is an exploded perspective view of a hard drive carrier.

Shown in FIG. 1 is an exploded perspective view of a drive carrier, which is indicated generally at 10. Drive carrier 10 is inserted into a slot in a chassis assembly. Drive carrier 10 includes a frame 22 that is sized to receive a hard drive 30. Frame 22 is formed of a side wall 24, a bottom wall 28, a top wall 26, and an EMI shield 34. A latch 16 is coupled to a bezel 18 about a cam lever 20. Bezel 18 is coupled to EMI shield 34 through a pair of thread-forming screws 17. A top guide rail 12 is coupled to the top wall 26 of frame 22. Positioned between top guide rail 12 and frame 22 is a light pipe 38, which extends along the length of frame 22 and provides for the transmission of diagnostic or operational light signals from the interior of the chassis to the bezel of the hard drive carrier.

A bottom guide rail 14 is coupled to bottom wall 28 of frame 22. Bottom guide rail 14 includes a number of apertures formed therein. Each of the apertures is sized to receive a keying pin 36. The placement of keying pins in the aperture forms a mechanical barrier that prevents the hard drive carrier from being slid into a chassis assembly that is not mechanically designed to accommodate the connector of the hard drive of the hard drive carrier. As such, the keying pins can be placed into bottom guide rail 14 such that the hard drive carrier can only be placed in a chassis assembly that is mechanically designed to mate with the connector of the hard drive of the hard drive carrier. Frame 22 is sized to receive a converter card 32, which includes a connector 33. Converter card is positioned between the top wall 26 and bottom wall 28 of frame 22. Converter card is coupled to the rear connectors of hard drive 30.

The hard drive of the hard drive carrier can be positioned in a front or forward position in which the hard drive is closer to the bezel. The hard drive of the hard drive carrier can also be positioned in a rear position in which the hard drive is farther away from the bezel of the frame. Hard drive 30 includes a pair of alignment holes 37 for receiving screws 36. To place hard drive 30 in a front or forward position, alignment holes 37 of hard drive 30 are aligned with a front pair of alignment holes 42 in top wall 26 and a front set of alignment holes 43 in top guide rail 12. To place hard drive 30 in a rear position, alignment holes 37 of hard drive 30 are aligned with a rear set of alignment holes in top wall 26 and a rear set of alignment holes 41 in top guide rail 12. Whether hard drive 30 is positioned in a forward position or a rear position, hard drive 30 is secured to top wall 26 of frame 22 and top rail guide 12 by a pair of flat head screws 36 that are secured through the respective alignment holes of the top guide rail, top wall, and hard drive. In addition, top wall 26 of frame 22 includes at least one retention hook 45 for securing top guide rail 12 to top wall 26 of frame 22.

Figure 2B:
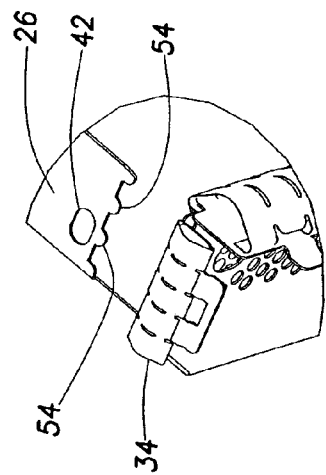
FIG. 2B is a perspective view of a top wall of a frame of a hard drive carrier following the removal of a detachable tab.
Figure 2D:
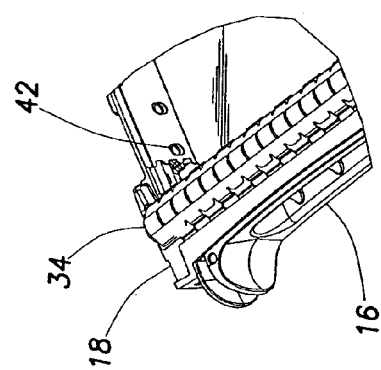
FIG. 2D is a perspective view of a frame of a hard drive carrier following the removal of a detachable tab.
Figure 2A:
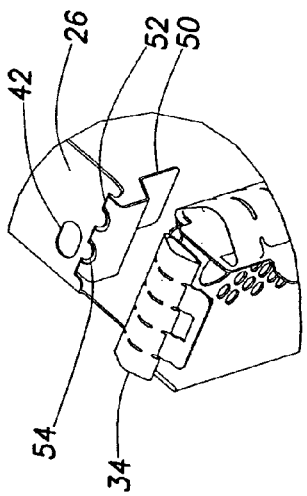
FIG. 2A is a perspective view of the attachment of a tab to a top wall of a frame of a hard drive carrier.

Top wall 26 includes a tab 50, which is positioned on the front end of top wall 26 and projects in a downward direction. Shown in FIG. 2A is a detailed perspective view of the tab 50. For the sake of clarity, some elements of the hard drive carrier are not shown in FIG. 2A. Tab 50 is detachable from top wall 26 and is coupled to top wall 26 about an attachment geometry that includes a series of valley portions 52 and raised or rounded portions 54. The attachment of tab 50 to top wall 26 is at valley portions 52. In the example of FIG. 2A, tab 50 is not coupled to top wall 26 at rounded portions 54. Tab 50 can be physically detached from top wall 26. In FIG. 2B, tab 50 is no longer attached to top wall 26. Tab 50 was formerly attached to the valley portions 52 of top wall 26. Although the valley portions 52 of top wall 26 may be formed of a metal and may have sharp edges as a result of the detachment of tab 50, a user is typically prevented from touching these sharp edges by rounded portions 54, which protrude and create a barrier that will typically prevent the finger of a user from scraping against the sharp edges of the valley or attachment portions 52.

Figure 2C:
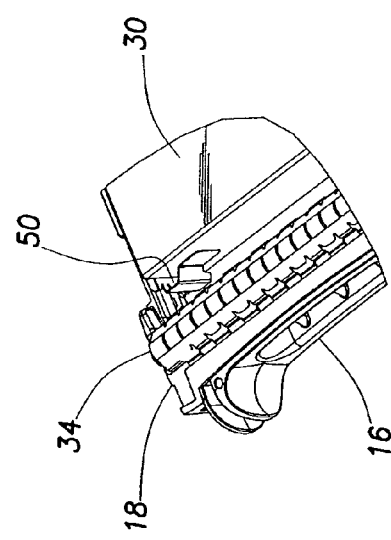
FIG. 2C is a perspective view of a hard drive carrier that includes a tab and a hard drive.

When the tab is in place and coupled to top wall 26, hard drive 30 can only be positioned in a rear position in hard drive carrier 10. Shown in FIG. 2C is an example of a hard drive carrier in which the tab is in place and the hard drive 30 is placed in a rear position in which the hard drive is positioned a distance from bezel 18. When the hard drive 30 is placed in a rear position, hard drive carrier 10 may not include the optional converter card 32. In the absence of a converter card 32, hard drive 30 is directly connected to a connector of the chassis. When tab 50 is removed from top wall 26, as shown in FIG. 2D, hard drive 30 can be placed in a forward position nearest bezel 18. When tab 50 is removed from top wall 26, hard drive 30 is coupled to a converter card 32, which is in turn coupled to the connectors of the chassis. The placement of a detachable tab on top wall 26 permits a hard drive to be placed in one of two positions within the hard drive carrier. When the tab is detached, the hard drive is placed in a forward position, and the hard drive carrier may also include a converter card. When the tab is in place, the hard drive is in a rear position and is coupled directly to the converter of the chassis.

Figure 3C:
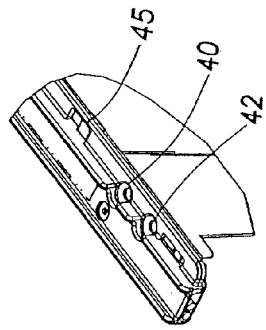
FIG. 3C is a perspective view of the placement of the attachment of a top guide rail to the top wall of a frame of a hard drive carrier.
Figure 3B:
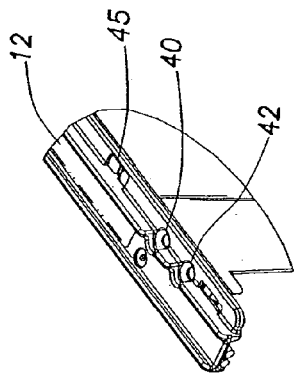
FIG. 3B is a perspective view of the placement of a top guide rail on a top wall of a frame of a hard drive carrier.
Figure 3A:
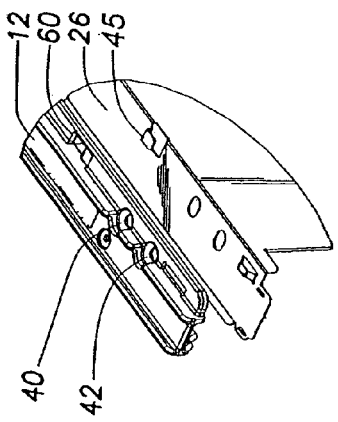
FIG. 3A is an exploded perspective view of a top wall of a frame and a top guide rail of a hard drive carrier.

Shown in FIGS. 3A–3C are a series of figures depicting the attachment of top guide rail 12 to top wall 26. FIG. 3A is an exploded view of guide rail 12 and top wall 26. Top wall 26 includes retention hooks 45, which are in vertical alignment with the retention holes 60 of top guide rail 12. In FIG. 3B, top guide rail 12 has been placed on top wall 26. Each retention hook 45 mates with a respective retention hole 60 such that the hook portion of each retention hook 45 fits through the aperture of the respective retention hole 60. In FIG. 3C, top guide rail 12 is slid forward relative to top wall 26, causing the hook portion of retention hooks 45 to engage a feature of the respective retention hole 60 of the top guide rail. The arrangement of the retention hooks 45 of top wall 26 and the retention holes 60 of top guide rail 12 provides for an attachment mechanism that is easy to manipulate and does not require an additional mechanical fixture, such as a screw. The snap-in attachment of the top guide rail to the top wall of the frame is accomplished before the insertion of the hard drive within the frame of the hard drive carrier. The attachment of the top guide rail to the top wall also serves to position and fix the light pipe to the hard drive carrier. The light pipe 38 of the hard drive carrier is positioned between the top guide rail and the top wall. The snap-in attachment of the top guide rail to the top wall fixes the light pipe to the hard drive carrier without the use of an additional mechanical fixture for the light pipe. Like the attachment of top guide rail 12 to top wall 26, bottom guide rail 14 is coupled to bottom wall 28 through the use of retention hooks in bottom wall 26 that are in alignment with retention holes in bottom guide rail 14. After the retention hole of bottom guide rail 14 are mated with the retention hooks of bottom wall 26, bottom guide rail 14 is slid forward relative to bottom wall 26 to cause the retention hooks of bottom wall 26 to engage a feature of the respective retention hole of the bottom guide rail.

Figure 4:
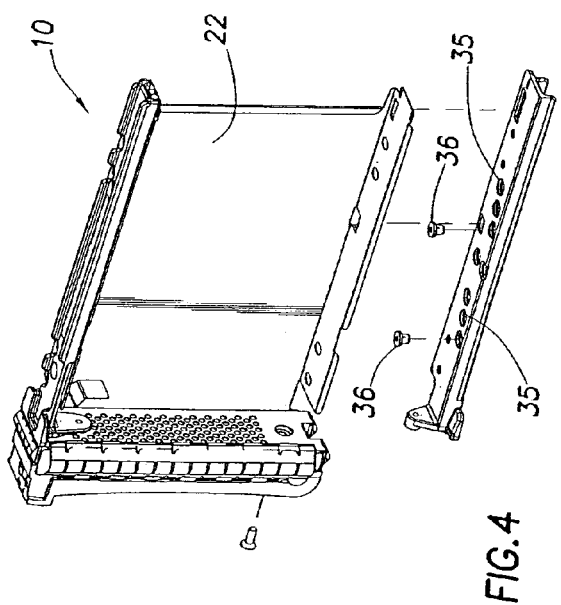
FIG. 4 is a perspective view of the frame and lower guide rail of a hard drive carrier.
Figure 5D:
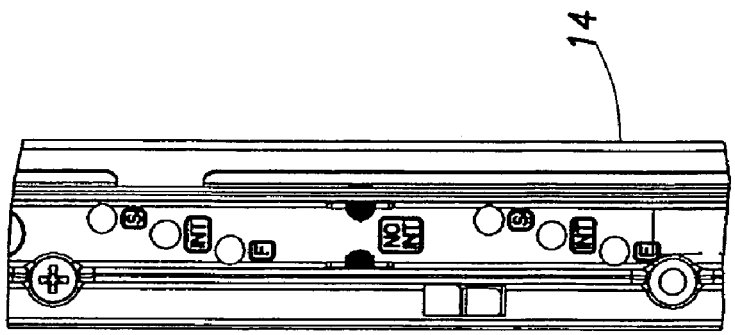
FIGS. 5A–5D are a series of diagram of keying arrangements for the keying holes of the lower guide rail of a hard drive carrier.
Figure 5C:
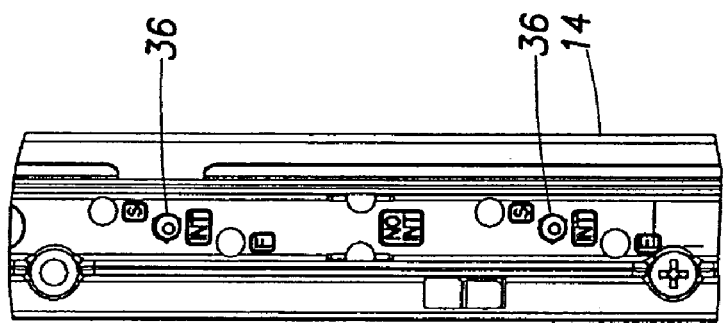
Figure 5B:
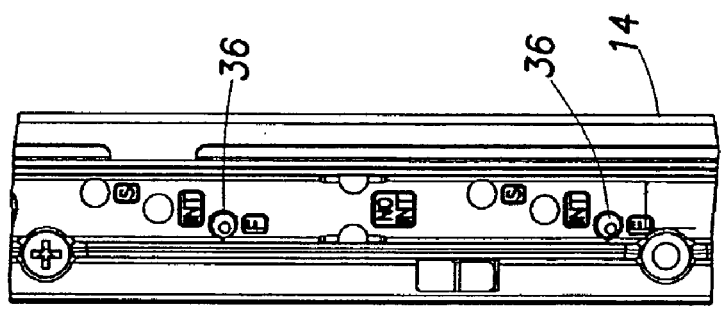
Figure 5A:
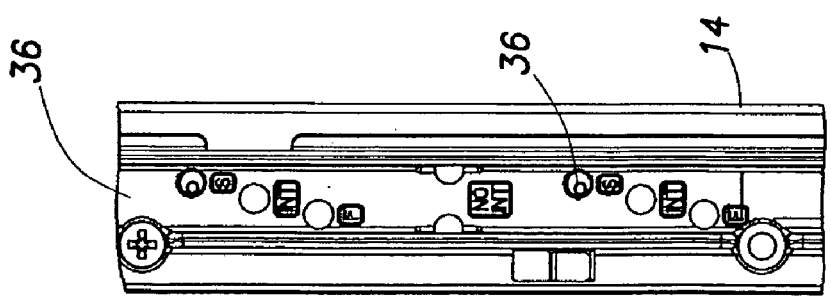

Shown in FIG. 4 are portions of a hard drive carrier, including frame 22 and lower guide rail 14. Lower guide rail 14 includes a number of keying holes 35 and a pair of keying pins 36. The placement of keying pins in certain keying holes insures that the hard drive carrier cannot be inserted in the slot of a chassis that includes a connector that does not match the type of hard drive included in the hard drive carrier. The lower surface of the slot of the chassis assembly may include a mechanical barrier. The keying pin must be inserted within a slot such that the pins that protrude downwardly from lower guide rail 14 do not interfere with the mechanical barrier in the slot of the chassis assembly. Shown in FIGS. 5A–5D are a number of arrangements for the placement of the keying pins in the keying holes of the lower guide rail. Each view is taken from below the lower guide rail. Shown in FIG. 5A is a keying scheme for a parallel SCSI hard drive. The keying pins are inserted in the right-most keying holes, which are the keying holes furthest from the side wall 24 of the hard drive carrier. Shown in FIG. 5B is a keying arrangement for a Fibre Channel drive in which keying pins 36 are placed in the left-most set of keying holes. Shown in FIG. 5C is a keying arrangement for a hard drive carrier that includes a converter card and a Serial ATA drive or a Serial Attached SCSI drive. Keying pins 36 are placed in the center set of keying holes. Shown in FIG. 5D is a keying arrangement for a hard drive carrier that includes a Serial ATA drive or a Serial Attached SCSI drive that plugs directly into the connectors of the chassis. The keying pins are placed in the hole set marked "NO INT" in the center of the rail.

Shown in FIGS. 6A–6E are series of pictorial views of the attachment and detachment of a converter card 32 to a hard drive carrier 10. Shown in FIG. 6A is an exploded view of the hard drive carrier 10 and converter card 32, which includes a connector 33. Converter card 32 is sized such that it is received between the top guide rail 12 and the bottom guide rail 14 of the hard drive carrier. Hard drive carrier 10 includes a top slot 70 and a bottom slot 72 for receiving converter card 32. Converter card 32 includes an upper spring tab 74 and a lower spring tab 76. Upper spring tab 74 is proximate top slot 74 and lower spring tab 76 is proximate bottom slot 72. Each of the upper spring tab 74 and the lower spring tab 76 is compliant, allowing the spring tabs to be canted inward toward the connector 33 for the purpose of attaching or detaching converter card 32 to hard drive carrier 10. Converter card 32 also mates with the connectors of hard drive 30.

Shown in FIG. 6B depicts the attachment of converter card 32 to hard drive carrier 10. Upper spring tab 74 is inserted in top slot 70, which action may cause spring tab 74 to cant inward in the direction of connector 30. To complete the installation of converter card 32 in hard drive carrier 10, as shown in FIG. 6C, lower spring tab is canted inward and pushed into place in bottom slot 76. Converter card 32 is pushed into place until an audible click is heard, indicating that the lower spring tab 76 has snapped into place in bottom slot 72. Shown in FIG. 6D and FIG. 6E are depictions of steps for removing converter card 32 from hard drive carrier 10. As shown in FIG. 6D, lower spring tab 76 of converter card 32 is canted inward, releasing lower spring tab 76 from bottom slot 72. Once lower spring tab 76 is released from its slot, converter card 32 can be pivoted out of its attachment to the hard drive carrier, as shown in FIG. 6E. The use of a spring attachment for converter card 32 permits the converter card to be snapped securely in place without the use of screws or any other type of additional mechanical attachment.

Although the present disclosure has been described in detail, it should be understood that various changes, substitutions, and alterations can be made hereto without departing from the spirit and the scope of the invention as defined by the appended claims.

What is claimed is:

1. A hard drive carrier, comprising:
    a bezel;
    a frame proximate the bezel, wherein the frame comprises,
        a side wall;
        a bottom wall; and
        a top wall; wherein the top wall includes a detachable tab;
    wherein a hard drive may be positioned in the frame in a rear position relative to the bezel when the detachable tab is in place, and a hard drive may be positioned in the frame in a forward position relative to the bezel when the detachable tab is detached from the top wall of the frame.

2. The hard drive carrier of claim 1, wherein the detachable tab is coupled to the top wall of the frame according to an attachment geometry, wherein the attachment geometry comprises:
    at least one valley portion between at least two protruding portions;
    wherein the detachable tab is attached to the top wall at the valley portion and not at the protruding portions such that, when the detachable tab is detached from the top wall, access to the valley portion is made more difficult by the presence of the protruding portions.

3. The hard drive carrier of claim 1, wherein the top and bottom walls of the frame include a first set of alignment holes for coupling the hard drive to the hard drive carrier when the hard drive is in the forward position and a second set of alignment holes for coupling the hard drive to the hard drive carrier when the hard drive is in the rear position.

4. The hard drive carrier of claim 1, further comprising:
at least one hook formed in the top and bottom walls of the frame; and
a guide rails that includes a retention hole in alignment with the hooks of the top and bottom walls;
wherein the guide rails are coupled to the top and bottom walls of the frame by passing at least a portion of the retention hook through the retention hole of the guide rails and sliding the retention hook relative to the top and bottom guide walls to attach the guide rails to the top and bottom walls of the frame.

5. The hard drive carrier of claim 1, further comprising:
a lower guide rail coupled to the lower wall of the frame;
wherein the lower guide rail includes a number of keying holes for the insertion of keying pins therein such that the keying pins prevent the lower guide rail from being slid into certain slots in a chassis.

6. The hard drive carrier of claim 1, further comprising:
a converter card, wherein the converter card is operable to be coupled to the connector of a hard drive that is inserted in the frame of the hard drive carrier;
wherein the converter card includes a top spring and a bottom spring for coupling the converter card within the frame of the hard drive carrier.

7. The hard drive carrier of claim 4, wherein the top and bottom guide rails include a first set of alignment holes for coupling the hard drive to the hard drive carrier when the hard drive is in the forward position and a second set of alignment holes for coupling the hard drive to the hard drive carrier when the hard drive is in the rear position.

8. A hard drive carrier, comprising:
a bezel;
a frame proximate the bezel, wherein the frame comprises,
  a side wall;
  a bottom wall; and
  a top wall, wherein the top and bottom walls of the frame include a first set of alignment holes for coupling a hard drive to the hard drive carrier when the hard drive is in a forward position relative to the bezel and a second set of alignment holes for coupling the hard drive to the hard drive carrier when the hard drive is in a rear position relative to the position of the bezel.

9. The hard drive carrier of claim 8, further comprising a top and bottom guide rail coupled to the top and bottom walls of the frame, wherein the top and bottom guide rails include a first set of alignment holes for coupling a hard drive to the hard drive carrier when the hard drive is in the forward position and a second set of alignment holes for coupling the hard drive to the hard drive carrier when the hard drive is in the rear position.

10. The hard drive carrier of claim 8,
wherein the top wall of the frame includes a detachable tab at the end of the top wall proximate the bezel;
wherein the detachable tab is detached from the top wall when the hard drive is in the forward position; and
wherein the detachable tab remains in place when the hard drive is in a rear position.

11. The hard drive carrier of claim 8, further comprising:
a lower guide rail coupled to the lower wall of the frame;
wherein the lower guide rail includes a number of keying holes for the insertion of keying pins therein such that the keying pins prevent the lower guide rail from being slid into certain slots in a chassis.

12. The hard drive carrier of claim 8, further comprising:
a converter card, wherein the converter card is operable to be coupled to the connector of a hard drive that is inserted in the frame of the hard drive carrier;
wherein the converter card includes a top spring and a bottom spring for coupling the converter card within the frame of the hard drive carrier.

13. The hard drive carrier of claim 9,
wherein the top and bottom walls include a retention hook;
wherein the top and bottom guide rails include a retention hole;
wherein the top and bottom walls can be coupled to the top and bottom guide rails by, placing at least a portion the retention hook of the top and bottom wall through the retention hole of the top and bottom guide rails and sliding the top and bottom guide rails relative to the top and bottom walls to cause the retention hook to engage the retention hole.

14. The hard drive carrier of claim 10, wherein the detachable tab is coupled to the top wall of the frame according to an attachment geometry, wherein the attachment geometry comprises:
at least one valley portion between at least two protruding portions;
wherein the tab is attached to the top wall at the valley portion and not at the protruding portions such that, when the tab is detached from the top wall, access to the valley portion is made more difficult by the presence of the protruding portions.

15. A hard drive carrier, comprising:
a frame, comprising,
  a side wall;
  a bottom wall; and
  a top wall, wherein the top and bottom walls includes a retention hook;
a top and bottom guide rail that includes a retention hole in alignment with the retention hook of the top and bottom wall;
wherein the top and bottom guide rails are coupled to the top and bottom walls of the frame by passing at least a portion of the retention hook though the retention hole of the top and bottom guide rails and sliding the retention hook relative to the top and bottom guide walls to attach the top and bottom guide rails to the top and bottom walls of the frame.

16. The hard drive carrier of claim 15, wherein the top and bottom walls of the frame further comprises a first set of alignment holes for coupling a hard drive to the hard drive carrier when the hard drive is in a forward position and a second set of alignment holes for coupling the hard drive to the hard drive carrier when the hard drive is in a rear position.

17. There hard drive carrier of claim 16, wherein the top and bottom guide rails further comprises,
a first set of alignment holes for coupling a hard drive to the hard drive carrier when the hard drive is in the forward position and a second set of alignment holes for coupling the hard drive to the hard drive carrier when the hard drive is in the rear position;
wherein the first set of alignment holes of the top and bottom guide rails are aligned with the first set of alignment holes of the top and bottom walls and wherein the second set of alignment holes of the top and bottom guide rails are aligned with the second set of alignment holes of the top wall.

18. The hard drive carrier of claim 17,
wherein the top wall of the frame includes a detachable tab at one end of the top wall;
wherein the detachable tab is detached from the top wall when the hard drive is in the forward position; and
wherein the detachable tab remains in place when the hard drive is in a rear position.

19. The hard drive carrier of claim 18, wherein the detachable tab is coupled to the top wall of the frame according to an attachment geometry, wherein the attachment geometry comprises:
at least one valley portion between at least two protruding portions;
wherein the detachable tab is attached to the top wall at the valley portion and not at the protruding portions such that, when the detachable tab is detached from the top wall, access to the valley portion is made more difficult by the presence of the protruding portions.

20. The hard drive carrier of claim 19, further comprising:
a lower guide rail coupled to the lower wall of the frame;
wherein the lower guide rail includes a number of keying holes for the insertion of keying pins therein such that the keying pins prevent the lower guide rail from being slid into certain slots in a chassis.

* * * * *